United States Patent [19]
Cataldo

[11] 3,842,808
[45] Oct. 22, 1974

[54] REGENERATIVE STEAM IGNITION INTERNAL COMBUSTION ENGINE

[75] Inventor: Roy S. Cataldo, Birmingham, Mich.

[73] Assignee: General Motors Corporation, Detroit, Mich.

[22] Filed: Mar. 26, 1973

[21] Appl. No.: 344,591

[52] U.S. Cl. ............ 123/25 P, 60/39.55, 123/25 R, 123/143 R
[51] Int. Cl. ...................... F02m 25/02, F02p 23/00
[58] Field of Search .... 123/25 R, 25 P, 25 C, 25 D, 123/25 A, 25 B, 143 R; 60/39.55

[56] References Cited
UNITED STATES PATENTS

| | | |
|---|---|---|
| 1,132,489 | 3/1915 | Reagan .......................... 123/25.21 |
| 1,160,480 | 11/1915 | Wheeler ........................ 123/25.21 X |
| 1,711,937 | 5/1929 | Glantz ............................ 123/25.2 X |
| 1,791,523 | 2/1931 | Chaudet ......................... 123/25.21 |
| 2,862,482 | 12/1958 | Hart ............................... 123/32 C X |

Primary Examiner—Charles J. Myhre
Assistant Examiner—Tony Argenbright
Attorney, Agent, or Firm—Robert J. Outland

[57] ABSTRACT

An internal combustion engine is provided with means for injection of high temperature steam into the combustion chamber to ignite combustible air-fuel mixtures over a wide range of mixture ratios. A steam boiler and condenser are provided to recover water vapor from the engine exhaust gases and to utilize exhaust heat to make the steam for ignition purposes.

2 Claims, 1 Drawing Figure

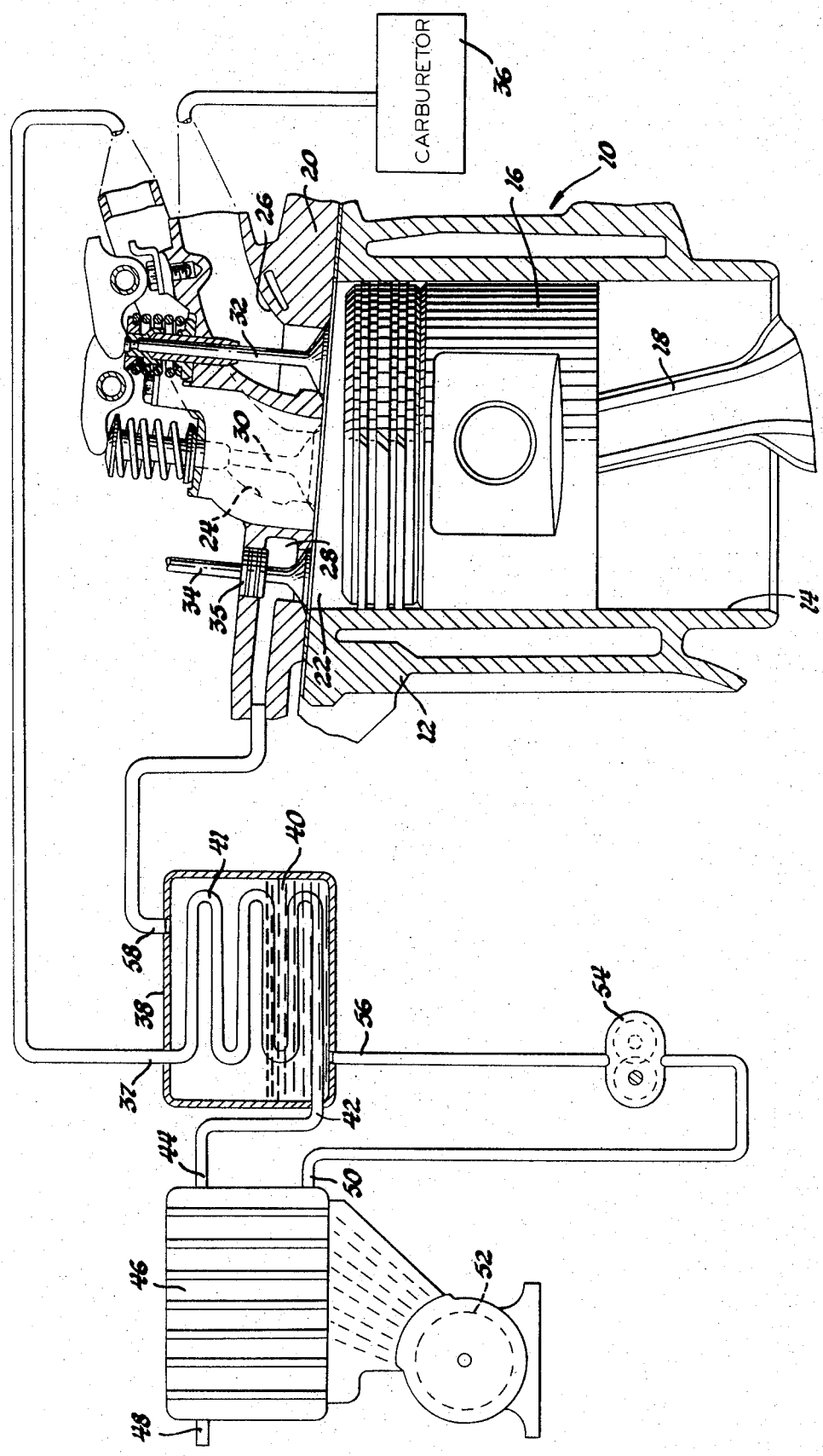

REGENERATIVE STEAM IGNITION INTERNAL COMBUSTION ENGINE

BACKGROUND OF THE INVENTION

This invention relates to internal combustion engines and, more particularly, to an engine and method including regenerative steam ignition to provide ignition and burning of air-fuel mixtures over a wide range of mixture ratios.

Internal combustion engines utilizing conventional spark ignition systems are limited in their ability to burn combustible mixtures of varying air-fuel ratios by the fact that ignition of the charge by a spark may be accomplished only in a relatively narrow range of ratios near the stoichiometric air-fuel ratio of 15 to 1. The increasing requirement to control emissions from the exhaust of internal combustion engines has increased the need for combustion systems capable of igniting and burning air-fuel mixtures substantially leaner than stoichiometric, beyond the normal limits of spark ignition.

SUMMARY OF THE INVENTION

The present invention provides novel means for igniting air-fuel mixtures in an internal combustion engine utilizing steam injected into the cylinder at high temperatures as an ignition source. The steam is preferably formed from water recovered from the burned exhaust gases in the engine and vaporized by heat from the exhaust gases in a steam boiler. The supplying of high-temperature, high-pressure steam to the combustion chamber provides a method which is capable of igniting air-fuel mixtures at ratios much leaner than the stoichiometric ratio so that combustion temperatures may be limited, thereby limiting the production of oxides of nitrogen. The steam added to the mixture also acts as a diluent, further reducing combustion temperatures. Further, the excess oxygen in the lean air-fuel mixture results in nearly complete combustion of the fuel elements and minimization of carbon monoxide and hydrocarbon emissions.

These and other advantages of the invention will be more clearly understood from the following description of a specific embodiment, taken together with the accompanying drawing.

BRIEF DESCRIPTION OF THE DRAWING

The single drawing figure is a diagrammatic view showing an internal combustion engine having a regenerative steam ignition means according to the invention.

DESCRIPTION OF THE ILLUSTRATED EMBODIMENT

In the drawing, numeral 10 generally indicates an internal combustion engine formed according to the invention and including a cylinder block 12 defining a plurality of cylinders 14, only one of which is shown. A piston 16 is reciprocably disposed in each of the cylinders 14 and connected through a connecting rod 18 to a conventional crankshaft, not shown, for the delivery of power from the reciprocating pistons. A cylinder head 20 closes the upper ends of the cylinders 14 and defines with each of the cylinders and their respective pistons a variable volume working and combustion chamber 22.

The cylinder head is provided at each cylinder with an exhaust port 24 and first and second inlet ports 26, 28, respectively, which connect with the respective combustion chambers 22. The exhaust and first inlet ports 24, 26 are respectively provided with conventional poppet-type exhaust and inlet valves 30, 32, which are controlled in conventional fashion in a manner to be subsequently described. The second inlet port 28 of each cylinder is controlled by a pressure-balanced poppet valve 34 provided to regulate the admission of high pressure steam to the combustion chamber 22 in a manner to be subsequently described. In addition to the usual head, valve 34 includes a ring-sealed gland 35 about equal in diameter with the head to balance steam pressures acting on the valve.

The first inlet ports 26 of the cylinder head are connected with a carburetor 36 which is adapted to supply the ports 26 with a combustible air-fuel mixture having an air-fuel ratio which may be fixed or adjustable, as desired. It is also within the contemplation of the invention to supply an air-fuel mixture by fuel injection or other means, in place of the usual carburetor.

The exhaust ports 24 of the cylinder head are connected to the exhaust inlet 37 of a steam boiler 38 in which a supply of water 40 is contained. The steam boiler includes internal tubes 41 extending through the water and connecting the exhaust inlet 37 with an exhaust outlet 42. Outlet 42 is in turn connected with the gas inlet 44 of a condenser 46, which also includes a gas outlet 48 and a condensate outlet 50. A blower 52 is provided to supply cooling air to the condenser 46. The condensate outlet of the condenser is connected with a condensate pump 54 which is in turn connected with the make-up water inlet 56 of the steam boiler 38. The boiler also includes a steam outlet 58 which is connected with the engine second inlet port 28.

The operation of the engine is as follows. Upon rotation of the crankshaft, the pistons reciprocate in timed relation to the inlet and exhaust valves so that each working chamber 22 performs the four-stroke cycle events of intake, compression, expansion and exhaust. On the intake stroke a combustible air-fuel mixture is drawn into the working chamber past the open valve 32 of the intake port 26. This mixture is then compressed on the compression stroke, at the end of which poppet valve 34 is opened, admitting a charge of high pressure steam into the compressed mixture. The steam is superheated to a temperature in excess of the ignition temperature of the mixture and, accordingly, causes immediate ignition and rapid burning of the mixture.

The burned mixture is expanded on the downward stroke of the piston with a resultant output of power to the crankshaft near the end of the expansion stroke, exhaust valve 30 is opened and the burned exhaust gases are forced out of the chamber 22 through port 24 on the exhaust stroke of the piston.

The exhaust gases pass first into the steam boiler 38, where they give up heat to the water, causing it to boil and form high-temperature, high-pressure steam. The steam is supplied directly to the inlet ports 28 of the engine for subsequent admission to the respective combustion chambers to ignite the air-fuel mixture. The exhaust gases then pass through the boiler to the condenser where they are cooled and the water vapor is condensed. The dehumidified gases pass out through the outlet 48 while the condensate is collected and drawn from the condenser by the condensate pump 54 which pumps the condensate back into the boiler under pressure for use in making more steam.

Suitable controls may be utilized to control the amount of moisture condensed from the exhaust gases so that an adequate amount of condensate is provided. If an excess supply is recovered, the unneeded amount may be drained out of the system. It should be apparent that for best operation and efficiency, the exhaust boiler, engine cylinder head and connecting steam and exhaust conduits should be insulated to retain heat within the system.

Because of the high specific heat of the high pressure and temperature steam used to ignite the mixture in the engine combustion chambers, it is possible to initiate combustion in mixtures over a substantially wider range of air-fuel ratios than is possible with conventional spark ignition systems. Accordingly, engines of the type described may be operated with extremely lean mixture ratios of, for example, between 20 and 30 parts of air to one part of fuel. With ratios in this range, combustion of the fuel is nearly complete due to the excess air present, yielding low residuals of carbon monoxide and hydrocarbons. In addition, combustion temperatures are minimized by the excess air, as well as the additional water vapor in the steam supplied for ignition purposes, so that formation of oxides of nitrogen in the combustion process is substantially reduced. In this way, the engine may be operated to have low emission characteristics.

It is considered that engines according to the invention could utilize conventional cylinder compression ratios in the range of, for example, 8:1 to 11.5:1. While a wide range of air-fuel ratios could also be utilized, it is thought that a range from about 18:1 to 26:1 would be best for limiting exhaust emissions.

Air-fuel mixture compressed to 800° F. (degrees Fahrenheit) may be ignited by injection of a steam charge of about 9.5 percent by weight at a temperature of 1,200° to 1,650° F. Peak combustion temperatures could reach 4,200° F., varying with compression and air-fuel ratios, with exhaust gases being supplied to the boiler at about 2,000° F. Upon reaching the condenser, the exhaust gases will have been cooled to about 900° F. through rejection of heat to the water and steam. Further cooling in the condenser to about 125° F. is sufficient to condense about half the water vapor in the gases, enough to make up for that injected in the initial charge for ignition purposes.

Special provisions are needed for startup of engines according to the present invention. However, these may take the form of conventional devices. For example, spark ignition means may be provided in the cylinders to ignite the air-fuel mixture for starting and running until such time as the exhaust steam boiler has been heated to the point where it provides steam at a sufficient pressure and temperature level to provide for ignition in the previously described manner. In this circumstance, operation of the engine at conventional air-fuel ratios would be required during the starting and warmup period.

An alternative starting method might involve the provision of fuel heating means for the steam boiler so that steam at sufficient temperature and pressure is provided for operating the engine immediately upon its starting. With this method, the engine could be operated with the desired lean air-fuel ratios in the earliest stages of operation. However, additional means for controlling emissions from the boiler heating devices might be required.

While the invention has been described by reference to a preferred embodiment, it should be understood that numerous changes might be within the scope of the inventive concepts described and it is, accordingly, desired that the invention have the full scope permitted by the appended claims.

1. An internal combustion engine comprising means defining a variable volume working and combustion chamber,
   first admission means connected with said chamber and operable to admit air-fuel mixture to said chamber for compression and burning therein,
   second admission means connected with said chamber and operable to admit superheated steam thereto upon compression of said mixture, to ignite the compressed air-fuel mixture therein,
   exhaust means connected with said chamber and operable to exhaust burned gases therefrom,
   an exhaust heat boiler connected with said second admission means to supply superheated steam thereto, said boiler also being connected with said exhaust means to receive exhaust gases therefrom for heating condensate in said boiler to form steam,
   a condenser connected with said boiler to receive exhaust gases therefrom for condensation of the water vapor in said exhaust gases, and
   a condensate pump connected between said condenser and said boiler and operative during engine operation to pump condensate from said condenser to said boiler, said components being operative to supply said superheated steam to said chamber near its smallest working volume in sufficient quantity and at a temperature capable of igniting and causing combustion of the compressed lead air-fuel mixtures therein.

2. The method of operating a steam-ignition internal combustion engine including the steps of
   cyclically admitting a combustible mixture of air and fuel to an expansible chamber of the engine and compressing said mixture therein,
   injecting a quantity of superheated steam into said chamber sufficient in mass and temperature to ignite the mixture therein,
   burning the mixture and expanding the chamber to develop power,
   passing burned gases from the chamber through a water-containing steam boiler, yielding heat to the water and forming steam for subsequent injection into the chamber, and
   subsequently condensing water vapor in the burned gases and rejecting the dehumidified gases while pumping the condensate under pressure into the boiler for heating and vaporization.

* * * * *